United States Patent [19]

Oe et al.

[11] 3,941,048

[45] Mar. 2, 1976

[54] APPARATUS FOR LOADING GOODS ON A PALLET

[75] Inventors: Noboru Oe; Yozi Tsuboi, both of Kakogawa, Japan

[73] Assignee: Okura Yusoki Kabushiki Kaisha, Kakogawa, Japan

[22] Filed: Nov. 6, 1974

[21] Appl. No.: 521,258

[30] Foreign Application Priority Data

July 19, 1974 Japan.............................. 49-83582

[52] U.S. Cl................ 100/215; 100/264; 214/6 DK; 214/6 P; 214/6 S
[51] Int. Cl.².......................................... B65G 57/24
[58] Field of Search .................. 214/6 P, 6 DK, 6 S; 100/215, 264

[56] References Cited
UNITED STATES PATENTS

| | | | |
|---|---|---|---|
| 2,875,908 | 3/1959 | Woodcock ........................ | 214/6 DK |
| 3,111,233 | 11/1963 | Raynor............................ | 214/6 P X |
| 3,164,080 | 1/1965 | Miller, Jr.......................... | 214/6 P X |
| 3,567,046 | 3/1971 | Reist............................... | 214/6 H |
| 3,669,282 | 6/1972 | Carlson ............................ | 214/6 P |
| 3,698,572 | 10/1972 | Dahlem et al..................... | 214/6 DK |

Primary Examiner—Robert J. Spar
Assistant Examiner—L. G. Paperner
Attorney, Agent, or Firm—James E. Nilles

[57] ABSTRACT

This invention relates to an apparatus for loading goods on a pallet.

Said apparatus comprises a frame, a packed commodity dropping opening formed in said frame, a number of carriage rollers mounted for movement on said packed commodity dropping opening between the front and rear edges of said opening to close and open the opening, a fixed stopper disposed forwardly of said packed commodity dropping opening, a movable stopper disposed rearwardly of said packed commodity dropping opening, an elevational platform elevationally mounted beneath said packed commodity dropping opening and adapted to move upwardly and downwardly while supporting a pallet thereon, and a presser mounted above said packed commodity dropping opening and supported for vertical movement by a cylinder to press against bags holding commodities therein and supported by said carriage rollers.

3 Claims, 10 Drawing Figures

APPARATUS FOR LOADING GOODS ON A PALLET

BACKGROUND OF THE INVENTION

This invention relates to apparatus for loading goods on a pallet, and more particularly it is concerned with an apparatus for loading cements, fertilizers, feed stuff and like commodities which are adapted to be packed in bags on a pallet.

In one type of apparatus known in the art for loading commodities held in bags on a pallet, bags holding commodities therein are successively placed on a number of carriage rollers arranged in side-by-side relationship and supported at opposite ends by a pair of chains adapted to move along opposite sides of a machine frame, the carriage rollers move as the chains move while the bags are each held in place by a stopper, and the bags resting on the carriage rollers are successively dropped onto a pallet positioned below. In this type of apparatus, the contents of the bags tend to shift or flow in the direction in which the carriage rollers move and the bags become unevenly balanced. Thus, when a number of lopsided bags are placed on the pallet in vertically stacked relationship, the pile of bags tends to lean to one side. This tendency is particularly marked when the commodities held in the bags are powdery or particulate materials, and the pile of bags can easily crumble.

SUMMARY OF THE INVENTION

This invention obviates the aforementioned disadvantage of the prior art. The invention has as its object the provision of an apparatus for loading bags holding commodities therein on a pallet in which bags holding commodities therein and placed successively on the carriage rollers are forced against the rollers by a presser, and the bags holding commodities therein and dropped from the carriage rolles onto the pallet are also forced against the pallet by the presser so as to compress the bags and preclude the shifting or flowing of the contents of the bags in the direction of movement of the carriage rollers whereby the leaning to one side of the pile of bags holding commodities therein and placed on the pallet can be prevented.

Additional and other objects and features of the invention will become evident from the description set forth hereinafter when considered in conjunction with the accompanying drawings.

Figure 3:
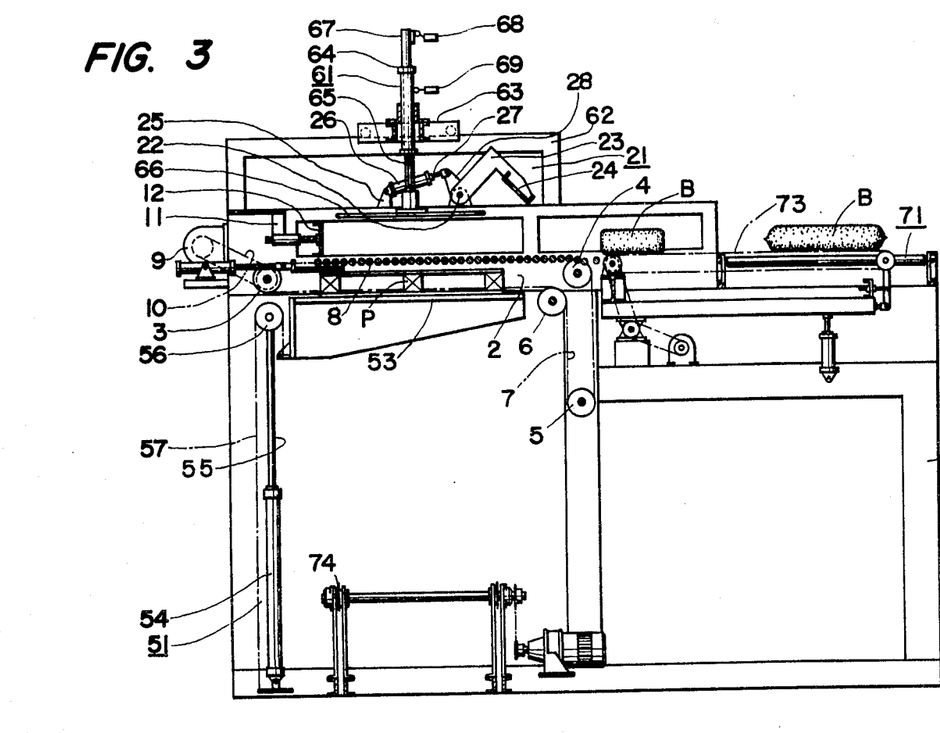
FIG. 3 is a side view as seen from the right of the apparatus shown in FIG. 1, with certain parts being cut out.

DESCRIPTION OF THE PREFERRED EMBODIMENTS 1 is a frame which is formed in its upper portion with a packed commodity dropping opening 2. As shown in FIG. 3, sprocket wheels 3, 4, 5 and 6 are rotatably supported at opposite sides of the frame 1, and an endless chain 7 is trained over each set of sprocket wheels 3, 4, 5 and 6 so that the chain 7 is substantially in the form of a letter L. A number of carriage rollers 8 disposed in side-by-side relationship and adapted to open and close the packed commodity dropping opening 2 are supported at opposite ends by a portion of the endless chains 7 disposed at the opposite sides of the frame 1.

A reversible electric motor 9 is mounted at a front end of the frame 1 and connected through a chain or other transmission means 10 to the pair of sprocket wheels 3 disposed at the opposite ends of the front portion of the frame 1. When the electric motor 9 is rotated in the normal and reverse directions, its rotation is transmitted through the transmission means 10 to the sprocket wheels 3 at the opposite sides of the frame 1. Thus, rotation of the sprocket wheels 3 initiates rotation of other sprocket wheels 4, 5 and 6, so that the chains 7 can be moved back and forth. This moves the carriage rollers 8 forwardly and rearwardly of the frame 1, thereby closing and opening the packed commodity dropping opening 2.

A fixed stopper 12 supported by support bars 11 is mounted on the top of a front end portion of the frame 1 and disposed in a position which corresponds to the position of the front edge of the packed commodity dropping opening 2.

Movable stopper means 21 is mounted on the top of a rear end portion of the frame 1 and disposed in a position which corresponds to the position of the rear edge of the packed commodity dropping opening 2. The movable stopper means 21 is constructed as follows. A rotary shaft 22 is mounted at opposite ends on opposite sides of the frame 1 and disposed above and across the frame 1. A pair of substantially L-shaped arms 23 are attached at one end to the rotary shaft 22 and support at the other end a movable stopper 24 which is disposed parallel to the rotary shaft 22.

An air cylinder 26 for actuating the movable stopper 24 is supported at its base by a support 25 mounted on the top of one side of the frame 1 and receives therein a piston rod 27 which is connected at its front end portion to one end of a connecting rod 28 which is secured at the other end to one end portion of the rotary shaft 22. Upon actuation of the cylinder 26, the piston rod 27 moves into and out of the cylinder 26 to angularly rotate the rotary shaft 22 through the connecting rod 28. This moves the arms 23, so that the movable stopper 24 moves between its upper and lower positions.

Figure 1:
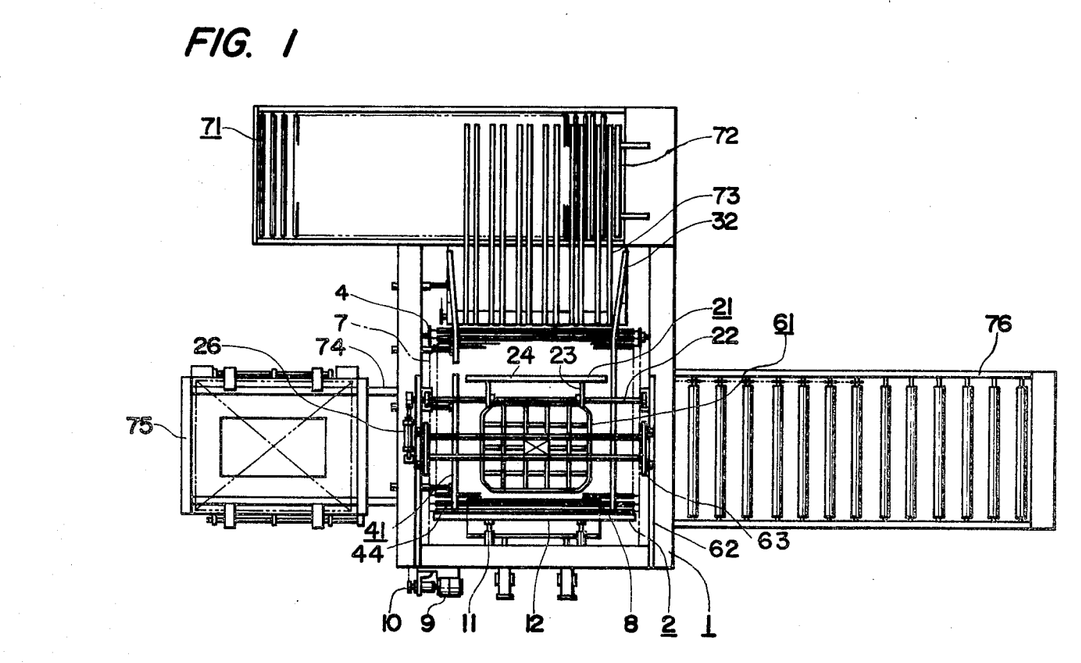
FIG. 1 is a plan view of the apparatus for loading goods on a pallet according to the invention.
Figures 8, 9, 10:
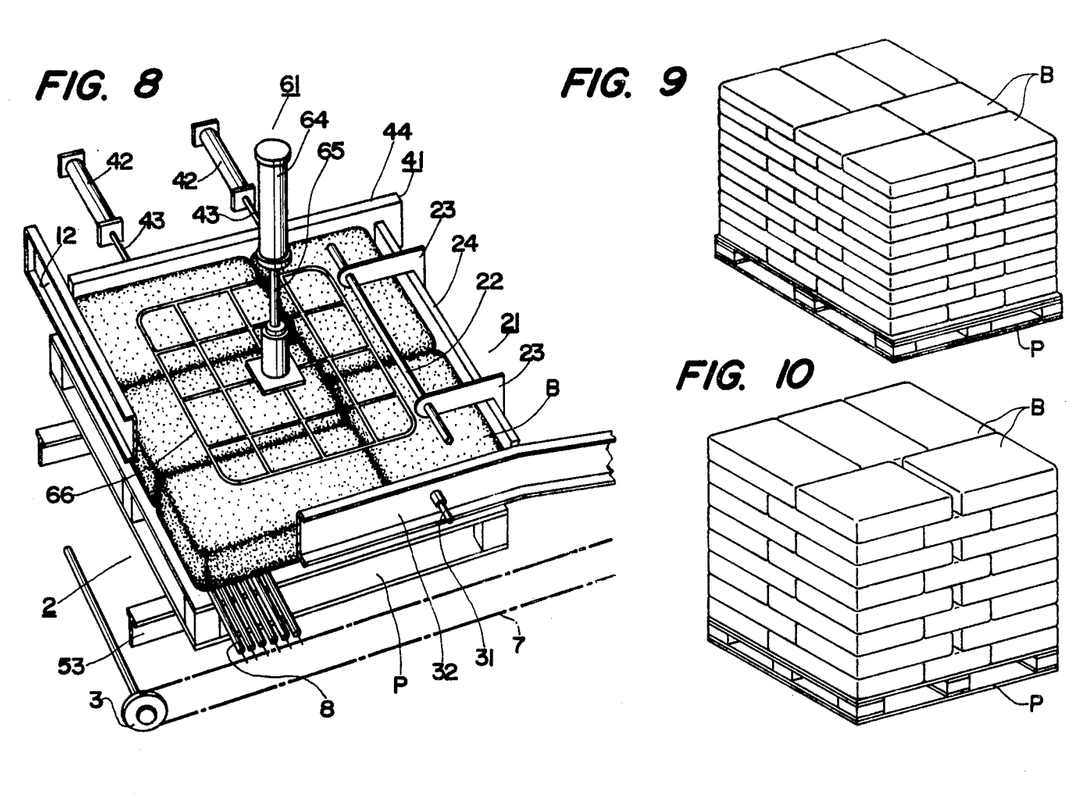
FIG. 8 is a perspective view of essential portions of the apparatus shown in FIG. 1, with certain parts being cut out.
FIG. 9 and FIG. 10 are perspective views of bags holding commodities therein piled on the pallet in vertically stacked relationship.

As shown in FIG. 1 and FIG. 8, a fixed guide 32 supported by a support member 31 is disposed on the top of the other side of the frame 1 and positioned at one edge of the packed commodity dropping opening 2. Movable guide means 41 is disposed on the top of the one side of the frame 1 and positioned at the other edge of the packed commodity dropping opening 2. The movable guide means 41 is constructed as follows. A plurality of air cylinders 42, 42 for the movable guide means 41 disposed parallel to each other are mounted on the frame 1 and each receive therein a piston rod 43 which supports a movable guide 44 at its front end. Upon actuation of the cylinders 42, the piston rods 43 move back and forth, thereby moving the movable guide 44 toward or away from the fixed guide 32 so as to thereby adjust the spacing between the two guides 32 and 44.

Figure 2:
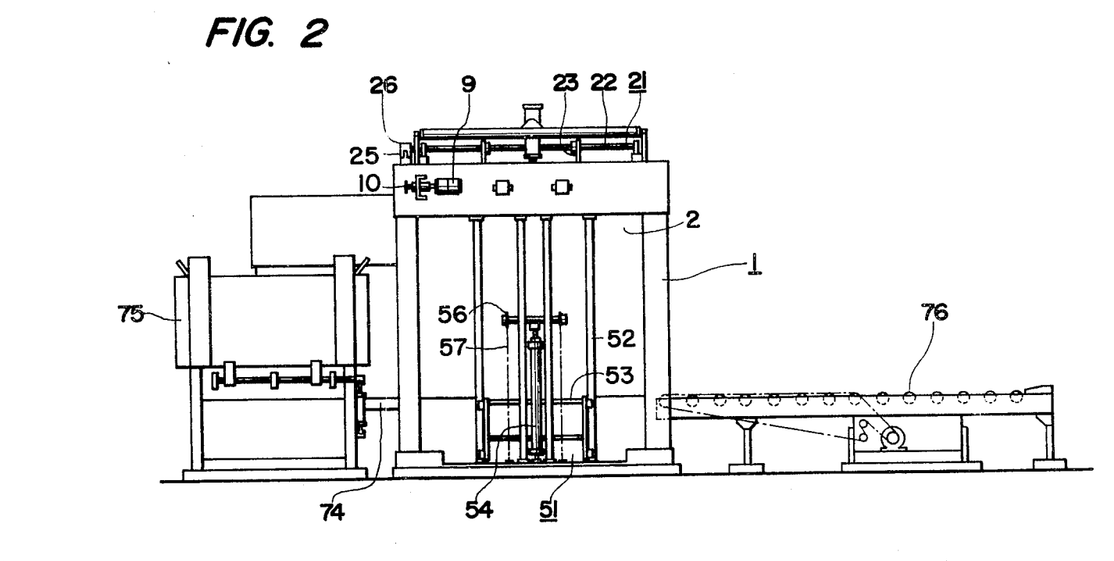
FIG. 2 is a front view of the apparatus shown in FIG. 1.

In FIG. 2 and FIG. 3, elevational means 51 is mounted beneath the packed commodity dropping opening 2. The elevational means 51 is constructed as follows. Vertically disposed guides 52 are provided in the frame 1 for guiding an elevational platform 53 in its vertical movement. A hydraulic cylinder 54 for operating the elevational platform 53 is provided in the frame 1 and disposed vertically. A piston rod 55 received in the hydraulic cylinder 54 and extending upwardly therefrom supports through a shaft a pair of sprockt wheels 56. A chain 57 fixed at one end to the bottom of the frame 1 and connected at the other end to the elevational platform 53 is trained over each of the sprocket wheels 56. Upon actuation of the hydraulic cylinder 54, the piston rod 55 moves into and out of the cylinder 54. This moves the sprocket wheels 56 upwardly and downwardly, so that the elevational platform 53 can be moved upwardly and downwardly along the guides 52 through the chains 57.

As can be best seen in FIG. 3, presser means 61 is disposed above the packed commodity dropping opening 2. The presser means 61 is constructed as follows. A rail 62 is mounted on the top of each side of the frame 1 so that the two rails 62, 62 are parallel to each other. Movably supported on the two rails 62, 62 is a movable platform 63 which mounts on its central portion an air cylinder 64 receiving therein a piston rod 65 extending downwardly from the cylinder 64 and supporting at its lower end a presser 66 which consists of pipes arranged to provide a lattice framework. Limit switches 68, 69 (See FIG. 3) are provided in upper and lower positions at which the limit switches are positioned against an actuating rod 67 extending upwardly from the piston rod 65. Upon actuation of the cylinder 64, the piston rod 65 moves into and out of the cylinder 64, thereby moving the presser 66 upwardly and downwardly. The limit switches 68 and 69 are actuated when the movement of the actuating rod 67 reaches its upper limit and lower limit respectively so as to thereby control the operation of the cylinder 64 and set the upper and lower limits of the movement of the presser 66. The movable platform 63 can be moved back and forth on the rails 62 to adjust the position of the presser 66.

71 is a delivery conveyor which may be a drive roller conveyor or the like. A stopper 72 is provided in a delivery end portion of the delivery conveyor 71. A feed conveyor 73 which may be a drive belt conveyor is elevationally mounted such that it extends from the delivery conveyor 71 to the package dropping opening 2.

A pallet conveyor 74 which may be a drive belt conveyor is provided beneath the packed commodity dropping opening 2. A pallet feed device 75 is mounted at one end portion of the pallet conveyor 74. A discharge conveyor 76 which may be a drive roller conveyor is located adjacent the pallet conveyor 74.

In operation, an empty pallet P is fed from the pallet food device 75 and delivered by the pallet conveyor 74 to a position which is disposed beneath the packed commodity dropping opening 2. The elevational means 51 is then actuated to move the elevational platform 53 upwardly. This lifts the pallet P away from the pallet conveyor 74 into a position in which the pallet P is disposed immediately beneath the packed commodity dropping opening 2.

At the same time, the related parts are brought to their positions shown in FIG. 3. More specifically, in the figure, the carriage rollers 8 are in a position in which they are disposed above the packed commodity dropping opening 2 to close the same; the elevational platform 53 is disposed in its uppermost position, so that the pallet P supported thereon is disposed immediately below the carriage rollers 8 closing the opening 2, the movable stopper 24 is at its upper position and the movable guide 44 is disposed outwardly of the packed commodity dropping opening 2; and the presser 66 is disposed in its uppermost position.

When the related parts are disposed in the aforementioned positions, bags B holding commodities therein are successively moved rightwardly in FIG. 1 by the delivery conveyor 71. Being stopped by the stopper 72, one bag after another changes its direction of movement and is fed by the feed conveyor 73 to the carriage rollers 8. The bags B holding commodities therein are successively stopped by the fixed stopper 12 and arranged in a predetermined pattern on the carriage rollers 8.

Figure 4:
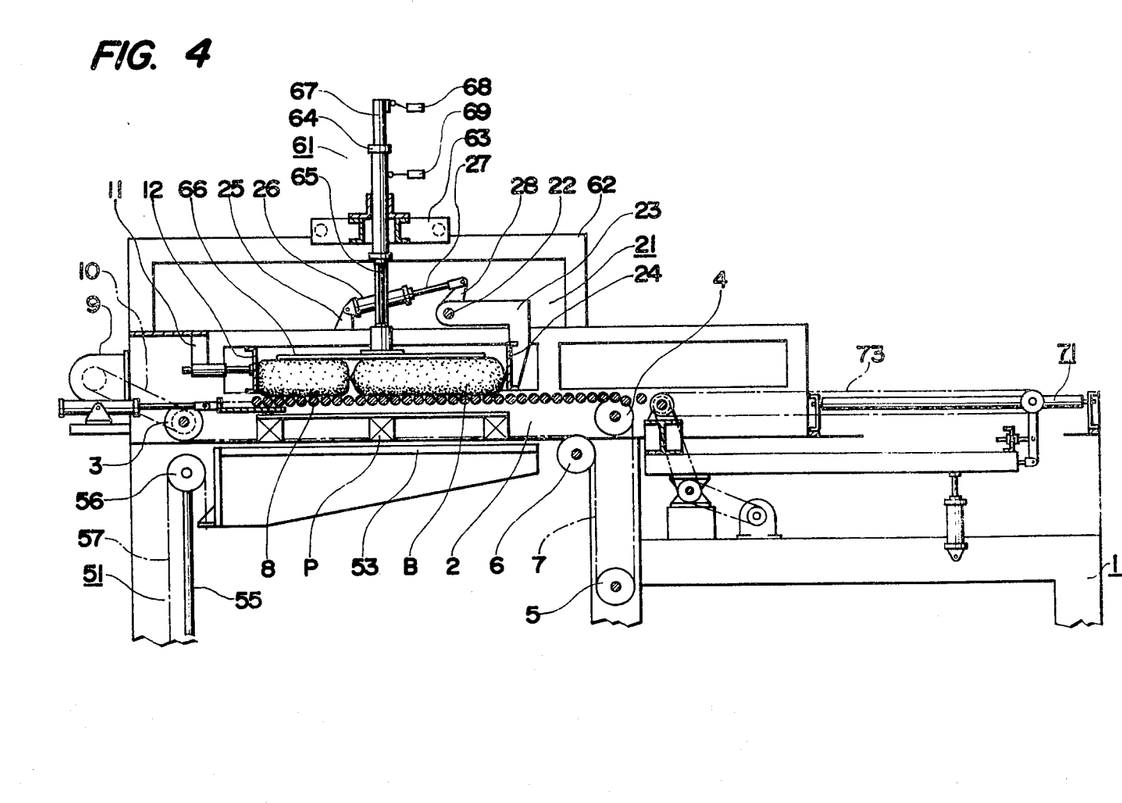
FIG. 4, FIG. 5, FIG. 6 and FIG. 7 are fragmentary side views of the apparatus shown in FIG. 1, showing the operation of the apparatus.

When the number of bags B holding commodities therein and arranged on the carriage rollers 8 reaches the predetermined number of bags B holding commodities therein for one layer of the predetermined pile of bags B holding commodities therein and stacked on the pallet P, the cylinder 26 for the stopper means 21 is actuated to move the movable stopper 24 to its lower position as shown in FIG. 4, so as to correctly position the bags B holding commodities therein longitudinally of the apparatus between the fixed stopper 12 and the movable stopper 24. At the same time, the movable stopper 24 engages the bags B holding commodities therein and disposed at the delivery end. Then, the cylinders 42 for the movable guide means 41 shown in FIG. 8 are actuated to move the movable guide 44 inwardly toward the packed commodity dropping opening 2, so as to thereby correctly position the bags B holding commodities therein transversely of the apparatus between the movable guide 44 and the fixed guide 32.

Thereafter, the cylinder 64 for the presser means 61 is actuated to move the presser 66 downwardly to press against the bags B holding commodities therein and disposed on the carriage rollers 8.

Figure 5:
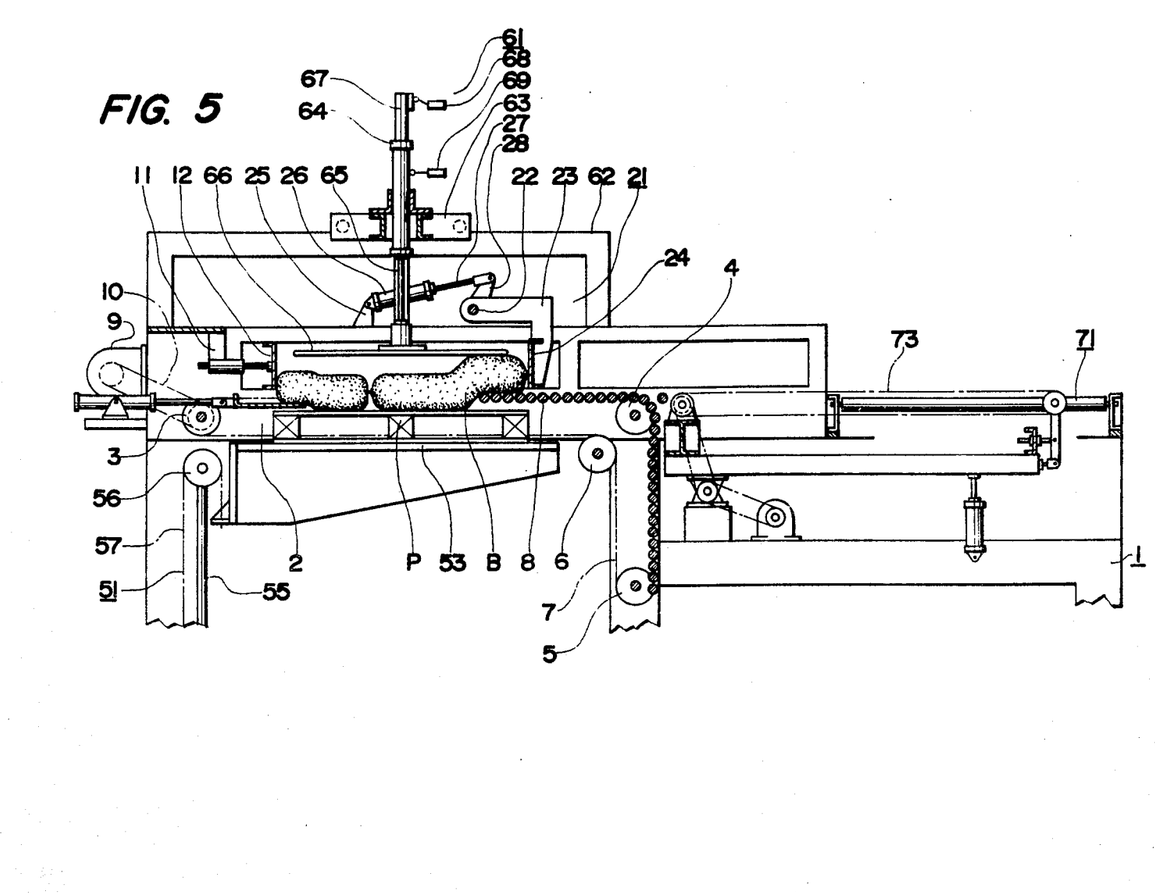

When the presser 64 is brought to a position in which pressure is brought to bear on the bags B holding commodities therein and disposed on the carriage rollers 8, the electric motor 9 shown in FIG. 5 is actuated to move the chains 7, 7 on the opposite sides of the frame 1. This moves the carriage rollers 8 from the position in which they close the packed commodity dropping opening 2 to a position in which they leave the opening 2 open, so that the layer of bags B holding commodities therein and disposed on the carriage rollers 8 move downwardly onto the upper surface of the pallet P. While the bags B holding commodities therein are moving downwardly, pressure is continuously applied thereto from above by the presser 66. This precludes shifting or flowing of the contents of the bags B which would otherwise be caused to occur by the moving carriage rollers 8, and permits the bags B holding commodities therein to move straight downwardly.

After this, the movable stopper 24 is brought to its upper position and the movable guide 44 is moved outwardly away from the packed commodity dropping opening 2.

Figure 6:
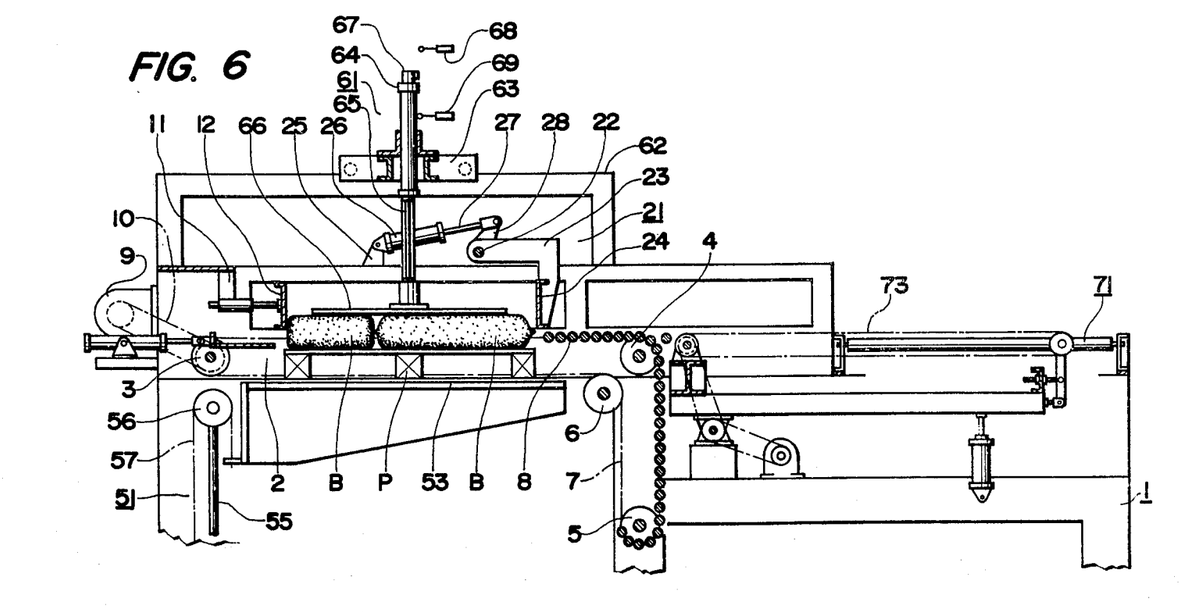
Figure 7:
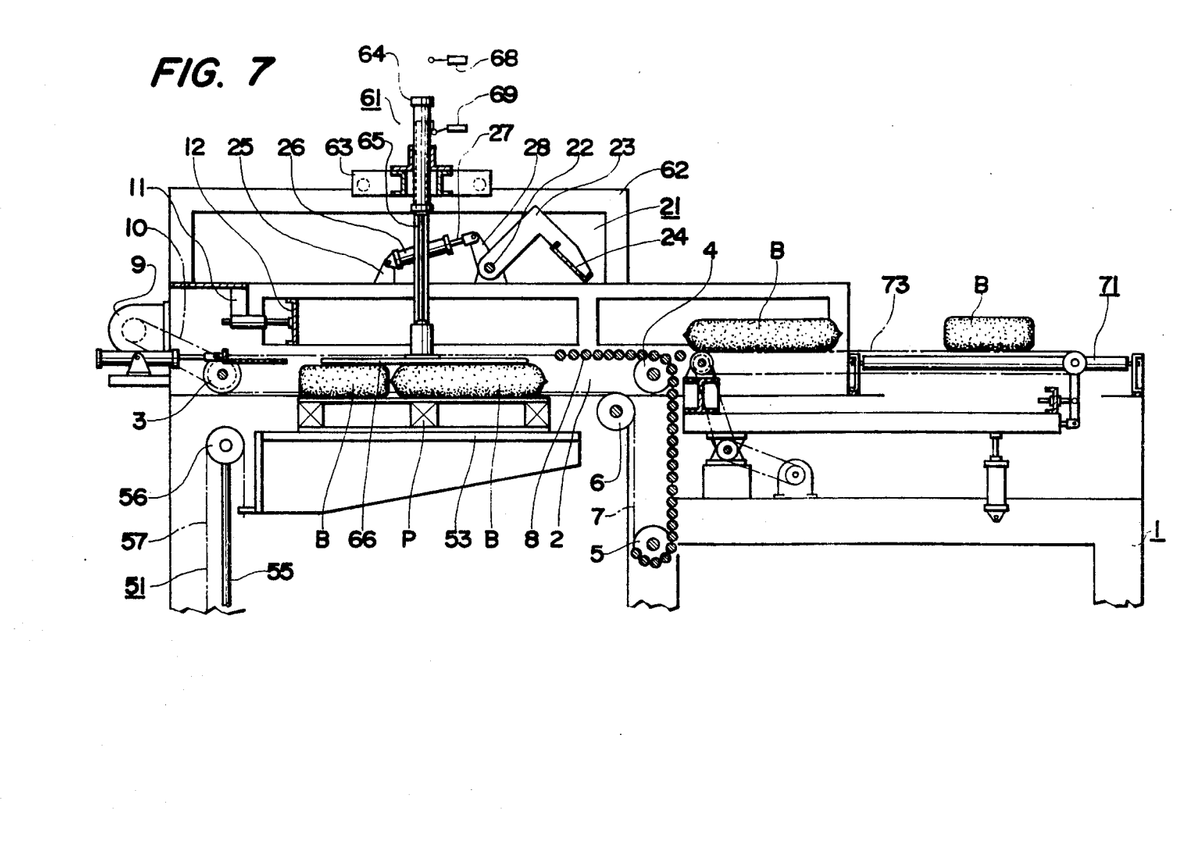

Then, the hydraulic cylinder 54 for the elevational means 51 is actuated as shown in FIG. 6 and FIG. 7 so as to move downwardly the elevational platform 53 a distance corresponding to the thickness of one layer of the bags B holding commodities therein. Upon the presser 66 reaching a position in which it is disposed below those carriage rollers 8 which are still disposed on the top of the frame 1, the downward movement of the elevational platform 53 is interrupted. At this time, the bags B holding commodities therein are transferred to the upper surface of the pallet P, and at the same time the presser 66 moves downwardly to apply pressure to the bags B holding commodities therein and disposed on the pallet P. When the pallet P moves downwardly as the elevational platform 53 moves downwardly, the presser 66 also moves downwardly so as to apply pressure to the bags B holding commodities therein all the way through the downward movement thereof. This achieves the benefit of flattening the layer of bags B holding commodities therein and disposed on the pallet P.

The presser 66 is then moved back to its upper position, and the chains 7 are moved in the opposite direction to move the carriage rollers 8 to a position in which they close the packed commodity dropping opening 2.

The aforementioned cycle of operation is repeated each time the bags B holding commodities therein and forming one layer of the predetermined pile of the bags on the pallet P are placed on the pallet P. In this way, a plurality of layers of the bags B holding commodities therein are superposed one on another in vertically stacked relationship on the pallet P. When the number of layers has reached the predetermined number, the elevational platform 53 is moved downwardly to its lowermost position, and the pallet P is transferred to the pallet conveyor 74 from which it is transferred to the discharge conveyor 76 and discharged from the apparatus.

In the apparatus according to the invention, the bags holding commodities therein and arranged in side-by-side relationship on the carriage rollers 8 are compressed by the presser 66, and they are continuously compressed by the presser 66 in moving downwardly from the carriage rollers 8 onto the upper surface of the pallet P. The invention offers the advantage of preventing shifting or flowing of the contents of the bags in the direction of movement of the carriage rollers 8 when the bags holding commodities therein are transferred from the carriage rollers 8 to the pallet P. Thus, the bags holding commodities therein and piled in vertically stacked relationship on the pallet are prevented from leaning to one side because no bags are unevenly balanced, and the pallet can be loaded beautifully with bags holding commodities therein.

What is claimed is:

1. An apparatus for loading goods on a pallet comprising a frame, a packed commodity dropping opening formed in said frame, said opening having front and rear edges, a pair of guides disposed on opposite sides of said packed commodity dropping opening, at least one of said pair of guides being a movable guide, a number of carriage rollers mounted for movement on said packed commodity dropping opening between the front and rear edges of said opening to close and open the opening and for receiving bags holding commodities thereon, said guides aligning said bags received on said carriage rollers, a fixed stopper disposed forwardly of said packed commodity dropping opening, a vertically movable stopper disposed rearwardly of said packed commodity dropping opening, means for forcing said movable stopper into engagement with said goods to position said goods, an elevational platform elevationally mounted beneath said packed commodity dropping opening and adapted to move upwardly and downwardly while supporting a pallet thereon, and a presser mounted above said packed commodity dropping opening and supported for vertical movement by a cylinder to press against bags holding commodities therein received on said carriage rollers, said bags holding commodities being dropped through said packed commodity dropping opening onto the pallet supported on said elevational platform while being pressed by said presser as said carriage rollers move from a position in which they close the packed commodity dropping opening to a position in which they leave the packed commodity dropping opening open, said presser and said guides maintaining the position of said bags as they are dropped onto said pallet, said cylinder including means for moving said presser downwardly together with the bags holding commodities therein so as to continuously press against the bags transferred to the pallet and to force the bags against the pallet.

2. An apparatus as claimed in claim 1 wherein said presser is in the form of a lattice framework.

3. An apparatus as claimed in claim 1 wherein said carriage rollers are driven by a pair of chains mounted on opposite sides of said packed commodity dropping opening.

* * * * *